(12) United States Patent
Kim et al.

(10) Patent No.: US 12,494,186 B2
(45) Date of Patent: Dec. 9, 2025

(54) DEVICE AND METHOD FOR MEASURING OVERSHOOT WITHOUT DISTORTION IN DISPLAY

(71) Applicant: LG ELECTRONICS INC., Seoul (KR)

(72) Inventors: Dokyun Kim, Seoul (KR); Seunghyun Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/719,778

(22) PCT Filed: Dec. 14, 2022

(86) PCT No.: PCT/KR2022/020364
§ 371 (c)(1),
(2) Date: Jun. 13, 2024

(87) PCT Pub. No.: WO2023/113468
PCT Pub. Date: Jun. 22, 2023

(65) Prior Publication Data
US 2025/0046272 A1   Feb. 6, 2025

(30) Foreign Application Priority Data
Dec. 14, 2021   (KR) .................. 10-2021-0179098

(51) Int. Cl.
*G09G 5/10*   (2006.01)
*G06T 7/00*   (2017.01)
(52) U.S. Cl.
CPC ............. *G09G 5/10* (2013.01); *G06T 7/0002* (2013.01); *G09G 2320/0233* (2013.01); *G09G 2320/0252* (2013.01)

(58) Field of Classification Search
CPC ........ G05B 11/01; G05B 19/401; G05B 5/01; G06T 7/0002; G09G 2320/0233; G09G 2320/0252; G09G 5/10
See application file for complete search history.

(56) References Cited

U.S. PATENT DOCUMENTS

2004/0070692 A1   4/2004  Pires
2008/0180385 A1*  7/2008  Yoshida ............... G09G 3/2074
                                                  345/87

FOREIGN PATENT DOCUMENTS

CN   117975849 A  *  5/2024
JP   2008-139430 A    6/2008
(Continued)

OTHER PUBLICATIONS

Yuan Cui, et al., "A perceived sharpness metric based on the luminance slope and overshoot of the motion-induced edge-blur profile", Journal of the SID, pp. 681-691. Dec. 20, 2012.

*Primary Examiner* — Kenneth Bukowski
(74) *Attorney, Agent, or Firm* — Bryan Cave Leighton Paisner LLP

(57) ABSTRACT

The present disclosure provides a method and a device for accurately determining a driving level of overdrive by accurately determining a reference luminance for measuring an overshoot degree of a display device. The present disclosure provides a device and a method for accurately determining the driving level of the overdrive by accurately determining the reference luminance using only a rise slope before overshoot occurs and an overshoot slope purely contributed by the overshoot when measuring the overshoot degree.

15 Claims, 10 Drawing Sheets

(56) References Cited

FOREIGN PATENT DOCUMENTS

| KR | 10-2007-0012443 A | 1/2007 |
|---|---|---|
| KR | 10-2009-0057570 A | 6/2009 |

\* cited by examiner

[FIG. 1]
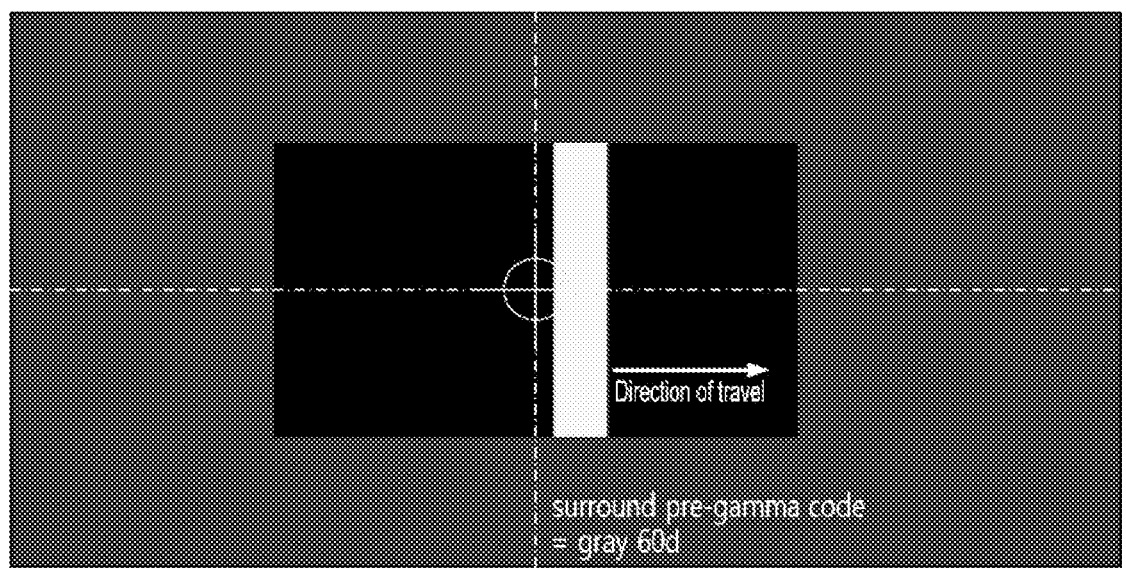

[FIG. 2]
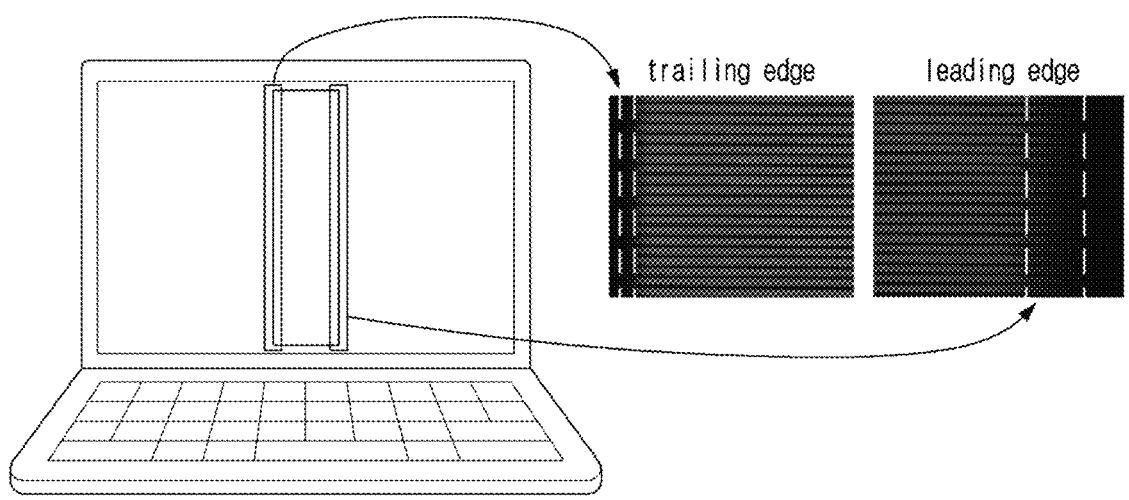

[FIG. 3]
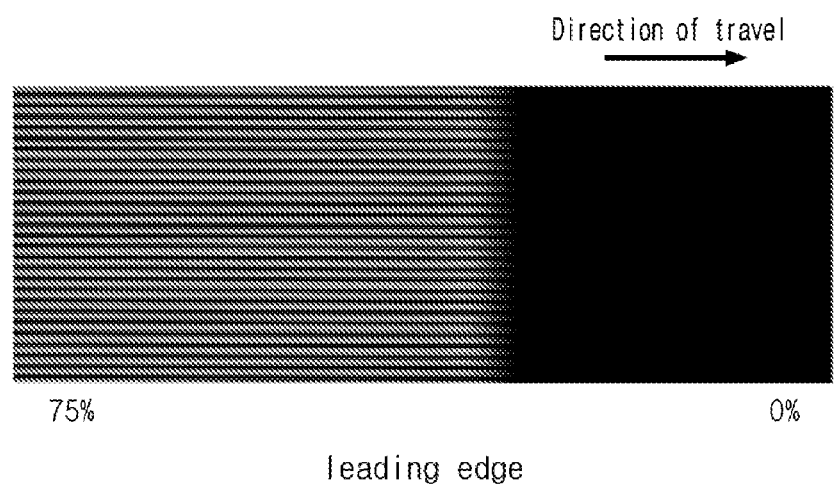
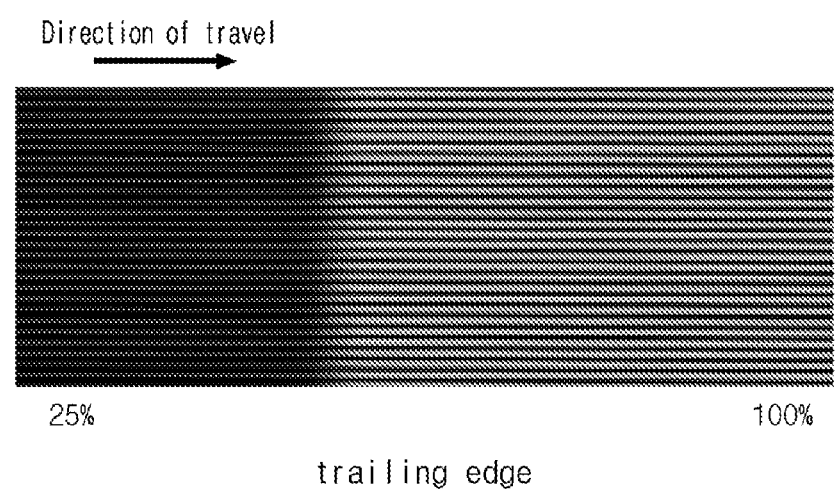

[FIG. 4]
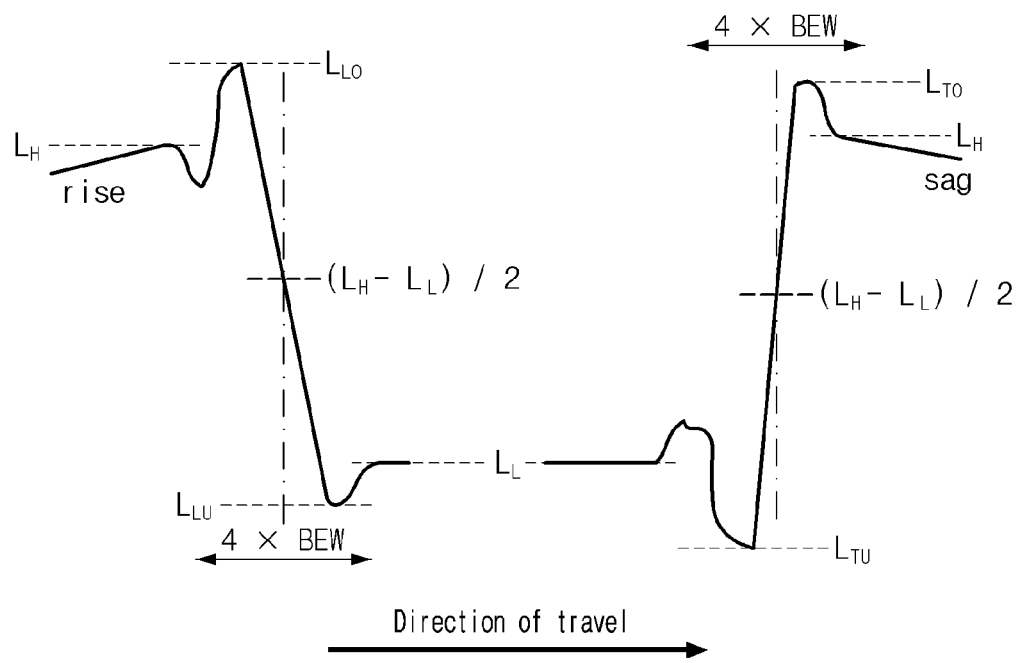

[FIG. 5]
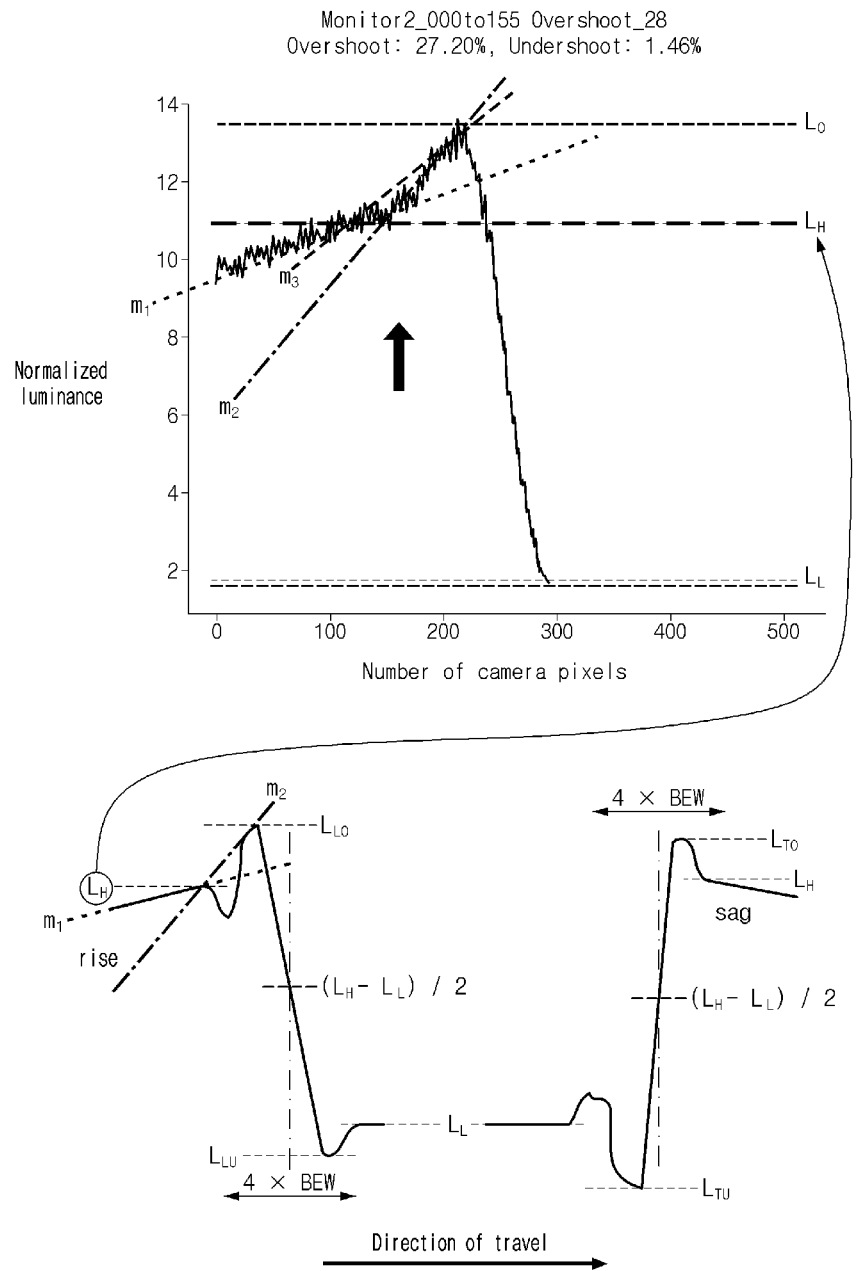

[FIG. 6]
Case 1
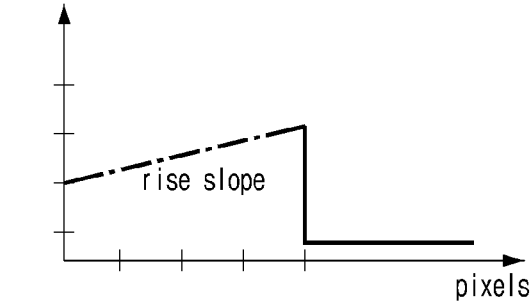
Rise Slope = Diff(1/4X + 2) = 1/4
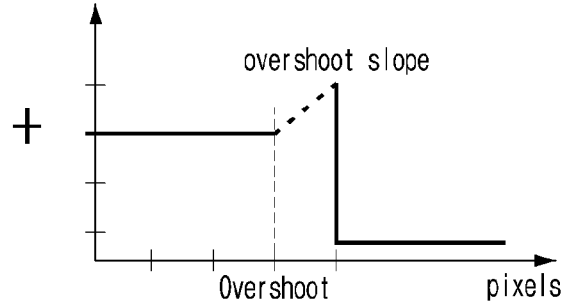
Overshoot Slope = Diff(X) = 1
||
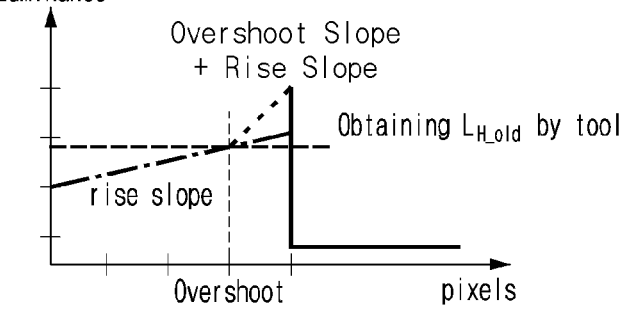
Overshoot + Rise slope = Diff(1/4X + 1X) = 5/4
Note: Diff( ) = Differential ( )

[FIG. 7]
Case 2
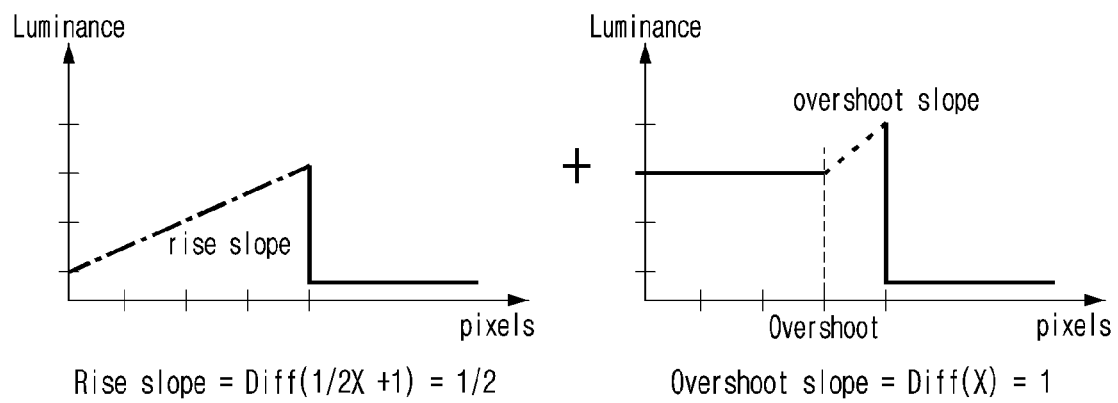
Rise slope = Diff(1/2X +1) = 1/2        Overshoot slope = Diff(X) = 1
=
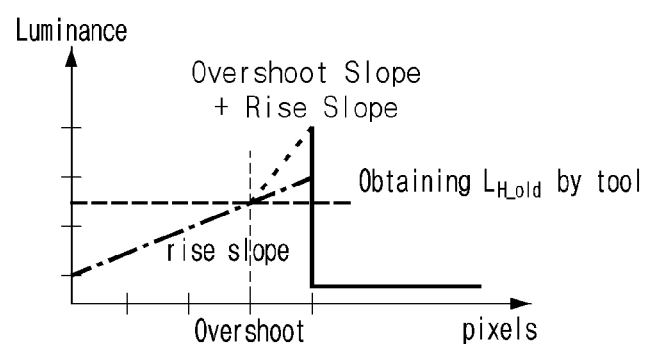
Overshoot + Rise slope = Diff(1/2X + 1X) = 3/2
Note: Diff( ) = Differential ( )

[FIG. 8]
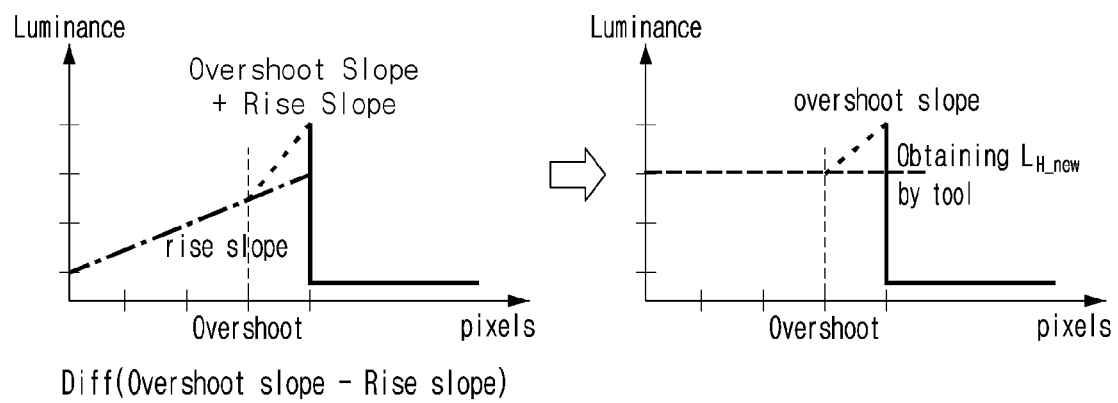

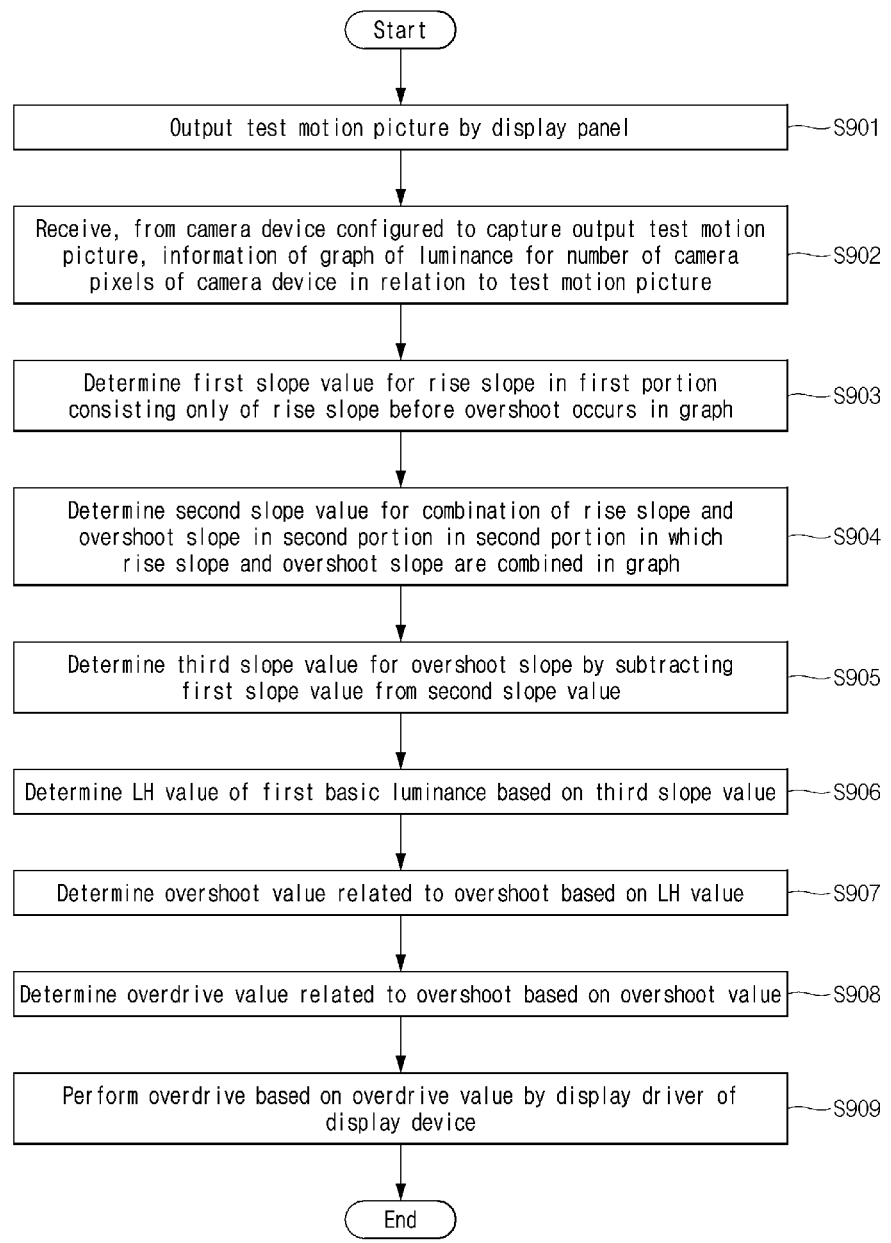

[FIG. 10]
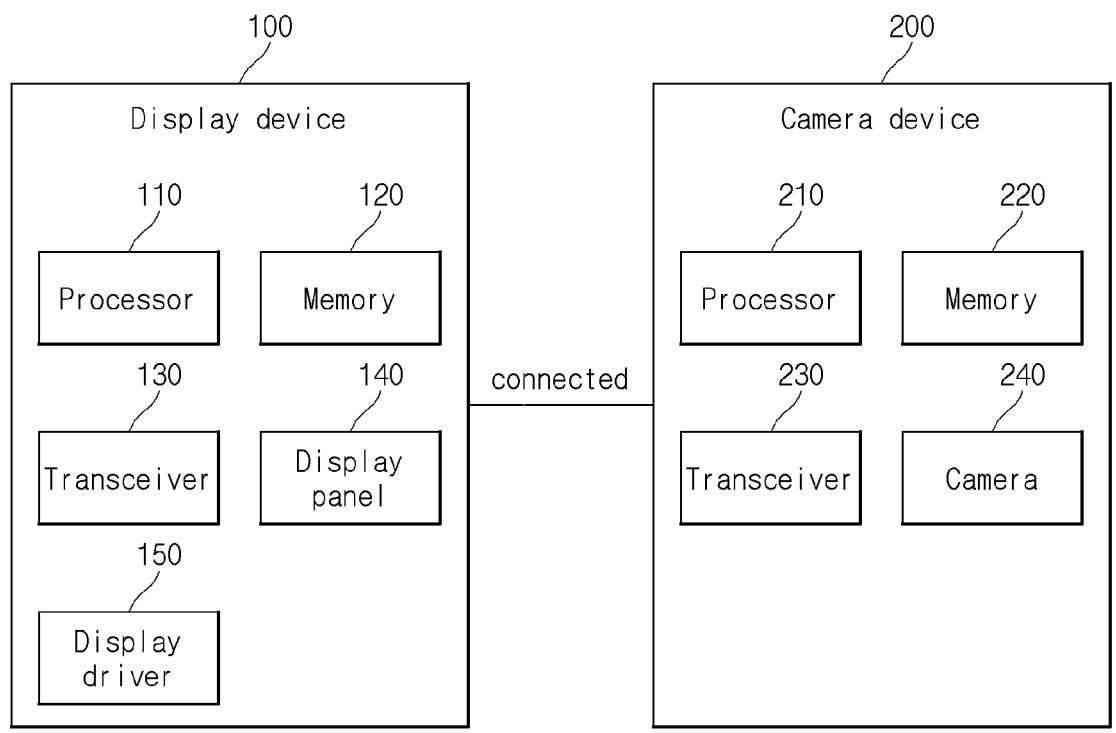

DEVICE AND METHOD FOR MEASURING OVERSHOOT WITHOUT DISTORTION IN DISPLAY

CROSS-REFERENCE TO RELATED APPLICATIONS

This application is the National Stage filing under 35 U.S.C. 371 of International Application No. PCT/KR2022/020364, filed on Dec. 14, 2022, which claims priority to KR Priority Document 10-2021-0179098, filed Dec. 14, 2021, the contents of which are all hereby incorporated by reference herein in their entirety.

TECHNICAL FIELD

The present disclosure relates to a display device. Particularly, the present disclosure relates to a device and a method for appropriately controlling a driving level of an appropriate overdrive by measuring overshoot without distortion in a display device.

BACKGROUND ART

Display modules are increasingly being used to display motion pictures and TV signals. A fast-moving object within a picture is a task of the display module. The reason is the reaction time of pixels of the display module to the required changes in luminance. Overdrive technology is known to enhance the reaction time.

Without overdrive, when a change in the luminance of a pixel is required, a driving voltage is applied to the pixel to ultimately reach the desired luminance. The luminance of the pixel gradually changes from a starting luminance to a desired luminance. When the motion picture signal is to be displayed, the required change in luminance needs to be achieved within a short period of time, the so-called frame period. The frame period is the duration for which a single image of the motion picture signal is supplied to the display module. During the frame period, every pixel of the display panel is processed once to receive a driving voltage.

When applying the driving voltage required to achieve the desired luminance to the pixel, the actual luminance of the pixel lags behind the desired luminance due to the inertia of the pixel. It may take several processing periods until the desired luminance is achieved, resulting in blurred edges or ghost images.

In order to shorten the reaction time of the pixel, an overdrive voltage is applied. The level of the overdrive voltage ultimately exceeds the level of the driving voltage required to obtain the desired luminance, and thus the overdrive luminance exceeding the desired luminance is aimed. When applying the overdrive voltage, it may usually take several processing periods until the overdrive luminance is reached. However, if the overdrive voltage is carefully selected, the luminance achieved at the end of a single processing period is equal to the desired luminance.

Using the overdrive technology, the desired luminance is reached within one processing period, and thus the reaction time of the pixel is artificially increased. The overdrive voltage required to achieve the desired luminance depends on the degree of overshoot measured in the required display. However, when measuring the degree of overshoot, a rise slope before the overshoot occurs and an overshoot slope purely contributed by the overshoot are mixed, so it is difficult to accurately determine a reference luminance for measuring the degree of overshoot.

DISCLOSURE

Technical Problem

In order to solve the aforementioned problem, the present disclosure provides a method and a device for accurately determining a driving level of overdrive by accurately determining a reference luminance for measuring an overshoot degree of a display device.

The present disclosure provides a device and a method for accurately determining the driving level of the overdrive by accurately determining the reference luminance using only a rise slope before overshoot occurs and an overshoot slope purely contributed by the overshoot when measuring the overshoot degree.

Technical objects to be achieved by the present disclosure are not limited to the aforementioned technical objects, and other technical objects not described above may be evidently understood by a person having ordinary skill in the art to which the present disclosure pertains from the following description.

Technical Solution

In order to solve the aforementioned problem, the present disclosure provides a method and a device for accurately determining a driving level of overdrive by accurately determining a reference luminance for measuring an overshoot degree of a display device.

The present disclosure provides a device and a method for accurately determining the driving level of the overdrive by accurately determining the reference luminance using only a rise slope before overshoot occurs and an overshoot slope purely contributed by the overshoot when measuring the overshoot degree.

Technical objects to be achieved by the present disclosure are not limited to the aforementioned technical objects, and other technical objects not described above may be evidently understood by a person having ordinary skill in the art to which the present disclosure pertains from the following description.

According to various embodiments of the present disclosure, provided is a method for operating a display device, which includes: outputting a test motion picture by a display panel of the display device; receiving, from a camera device configured to capture the output test motion picture, information of a graph of a luminance sensed by the camera device for the number of camera pixels of the camera device in relation to the test motion picture, wherein an x axis of the graph indicates the number of camera pixels and a y axis of the graph indicates a value of the luminance, and the graph is constituted by a first portion composed only of a rise slope before overshoot occurs, and a second portion in which the rise slope and an overshoot slope are combined; determining a first slope value for the rise slope in the first portion of the graph; determining a second slope value for the combination of the rise slope and the overshoot slope in the second portion in the second portion of the graph; determining a third slope value for the overshoot slope by subtracting the first slope value from the second slope value; determining an $L_H$ value of a first basic luminance based on the third slope value; determining an overshoot value related to the overshoot based on the $L_H$ value; determining an overdrive value related to the overshoot based on the overshoot value; and performing overdrive based on the overdrive value by a display driver of the display device.

According to various embodiments of the present disclosure, provided is a display device which includes: a display panel; a display driver; a transceiver; a memory; and at least one processor, in which the at least one processor is configured to output a test motion picture by the display panel, receive, from a camera device configured to capture the output test motion picture, information of a graph of a luminance sensed by the camera device for the number of camera pixels of the camera device in relation to the test motion picture, wherein an x axis of the graph indicates the number of camera pixels and a y axis of the graph indicates a value of the luminance, and the graph is constituted by a first portion composed only of a rise slope before overshoot occurs, and a second portion in which the rise slope and an overshoot slope are combined, determine a first slope value for the rise slope in the first portion of the graph, determine a second slope value for the combination of the rise slope and the overshoot slope in the second portion in the second portion of the graph, determine a third slope value for the overshoot slope by subtracting the first slope value from the second slope value, determine an $L_H$ value of a first basic luminance based on the third slope value, determine an overshoot value related to the overshoot based on the $L_H$ value, determine an overdrive value related to the overshoot based on the overshoot value, and perform overdrive based on the overdrive value by a display driver of the display device.

According to various embodiments of the present disclosure, provided is a control device for controlling a display device, which includes: at least one processor; and at least one memory operably accessing the at least one processor, in which the at least one memory stores instructions for performing operations based on being executed by the at least one processor, and the operations include: outputting a test motion picture by a display panel of the display device; receiving, from a camera device configured to capture the output test motion picture, information of a graph of a luminance sensed by the camera device for the number of camera pixels of the camera device in relation to the test motion picture, wherein an x axis of the graph indicates the number of camera pixels and a y axis of the graph indicates a value of the luminance, and the graph is constituted by a first portion composed only of a rise slope before overshoot occurs, and a second portion in which the rise slope and an overshoot slope are combined; determining a first slope value for the rise slope in the first portion of the graph; determining a second slope value for the combination of the rise slope and the overshoot slope in the second portion in the second portion of the graph; determining a third slope value for the overshoot slope by subtracting the first slope value from the second slope value; determining an $L_H$ value of a first basic luminance based on the third slope value; determining an overshoot value related to the overshoot based on the $L_H$ value; determining an overdrive value related to the overshoot based on the overshoot value; and performing overdrive based on the overdrive value by a display driver of the display device.

According to various embodiments of the present disclosure, provided are one or more non-transitory computer readable media storing one or more instructions, in which the one or more instructions perform operations based on being executed by one or more processors, and the operations include: outputting a test motion picture by a display panel of a display device; receiving, from a camera device configured to capture the output test motion picture, information of a graph of a luminance sensed by the camera device for the number of camera pixels of the camera device in relation to the test motion picture, wherein an x axis of the graph indicates the number of camera pixels and a y axis of the graph indicates a value of the luminance, and the graph is constituted by a first portion composed only of a rise slope before overshoot occurs, and a second portion in which the rise slope and an overshoot slope are combined; determining a first slope value for the rise slope in the first portion of the graph; determining a second slope value for the combination of the rise slope and the overshoot slope in the second portion in the second portion of the graph; determining a third slope value for the overshoot slope by subtracting the first slope value from the second slope value; determining an $L_H$ value of a first basic luminance based on the third slope value; determining an overshoot value related to the overshoot based on the $L_H$ value; determining an overdrive value related to the overshoot based on the overshoot value; and performing overdrive based on the overdrive value by a display driver of the display device.

Advantageous Effects

In order to solve the aforementioned problem, the present disclosure can provide a method and a device for accurately determining a driving level of overdrive by accurately determining a reference luminance for measuring an overshoot degree of a display device.

The present disclosure can provide a device and a method for accurately determining the driving level of the overdrive by accurately determining the reference luminance using only a rise slope before overshoot occurs and an overshoot slope purely contributed by the overshoot when measuring the overshoot degree.

DESCRIPTION OF DRAWINGS

The accompanying drawings, which are to provide a further understanding of the present disclosure, can provide embodiments of the present disclosure together with the detailed description. However, technical features of the present disclosure are not limited to specific drawings and features disclosed in the respective drawings may be combined with each other to constitute a new exemplary embodiment. Reference numerals in each drawing may refer to structural elements.

FIG. 1 is a diagram illustrating an example of a test motion picture for a display device.

FIG. 2 is a diagram illustrating an example of a moving-blur edge captured by a camera device.

FIG. 3 is a diagram illustrating an example of a blur edge captured by the camera device.

FIG. 4 is a diagram illustrating an example of a graph of the number of pixels vs. luminance measured by the camera device.

FIG. 5 is a diagram illustrating an example of a graph of the number of pixels vs. luminance measured by the camera device.

FIG. 6 is a diagram illustrating measurement of a reference luminance in a state in which a rise slope and an overshoot slope are combined.

FIG. 7 is a diagram illustrating measurement of a reference luminance in a state in which a rise slope and an overshoot slope are combined.

FIG. 8 is a diagram illustrating measurement of the reference luminance in a state in which the rise slope and the overshoot slope are separated.

FIG. 9 is a diagram illustrating an example of an operation process of the display device according to various embodiments of the present disclosure.

FIG. 10 is a diagram illustrating an example of a structure of the display device and the camera device according to various embodiments of the present disclosure.

MODE FOR DISCLOSURE

In various embodiments of the present disclosure, "A or B" may mean "only A," "only B," or "both A and B". In other words, "A or B" may be interpreted as "A and/or B" in various embodiments of the present disclosure. For example, in various embodiments of the present disclosure, "A, B or C" can mean "only A," "only B," "only C," or "any combination of A, B, and C".

A slash (/) or a comma used in various embodiments of the present disclosure may mean "and/or". For example, "A/B" may mean "A and/or B". Accordingly, "A/B" may mean "only A," "only B," or "both A and B". For example, "A, B, C" may mean "A, B, or C".

In various embodiments of the present disclosure, "at least one of A and B" may mean "only A," "only B," or "both A and B". Further, in various embodiments of the present disclosure, the expression "at least one of A or B" or "at least one of A and/or B" may be interpreted the same as "at least one of A and B".

Further, in various embodiments of the present disclosure, "at least one of A, B and C" may mean "only A," "only B," "only C", or "any combination of A, B and C". Further, in various embodiments of the present disclosure, the expression "at least one of A, B or C" or "at least one of A, B and/or C" may be interpreted the same as "at least one of A, B and C".

FIG. 1 is a diagram illustrating an example of a test motion picture for a display device.

According to various embodiments of the present disclosure, a test motion picture is output by a display device including a display panel, a display driver, a transceiver, a memory, and at least one processor. Further, the output test motion picture is captured by a camera device including a camera, the transceiver, the memory, and at least one processor. In various embodiments of the present disclosure, the camera may correspond to a digital high-speed camera.

Various embodiments of the present disclosure relate to a test method for processing an image stack by a scheme of generating a moving test pattern image stack captured by the digital high-speed camera and then providing a repeatable and objective clear motion ratio (CMR) value. The CMR value indicates an sharp or blurry pixel within an area of interest of a viewer.

Test Method:

(1) The test method is used to capture motion blur and extract a quantitative characteristic value that represents the performance of a display under test (DUT).

(2) The test method operates independently of panel technology in a display product that also includes backlight or emitting pixel technology.

(3) The test method is suitable for all displays or products with a built-in display because an experimenter does not have to rely on the ability to access an electrical signal that drives the display.

(4) Various embodiments of the present disclosure describe testing for a standard dynamic range (SDR) product. All reference and code values represent SDR signal levels. Such a measurement method may also be used for a high dynamic range (HDR) product, but the HDR support is beyond the scope of the specification.

(4) The test method does not include a current color or component test. In the test method, since the digital high-speed camera is used to capture an image, a transformation that uses a color sensing image sensor is suitable for measuring color dependency, including breakage from color separation or blur.

The test according to various embodiments of the present disclosure requires the following equipment.

(1) Digital high-speed camera with macro lens and memory card
(2) Stable mounting device such as heavy tripod
(3) Measuring device to check/measure focal length (useful but not required)
(4) Luminance measuring device (LMD) such as colorimeter or spectroradiometer to confirm pattern luminance When testing, a dark room should be used to maintain consistent and repeatable low light levels. Read from a dark area of the DUT.

A camera suitable for the CMR test has sufficiently high frame rate and light sensitivity. For example, a measurement resolution is limited by a frame capture rate (FCR) of the camera.

The camera type setting is independent of a display type and/or a function to access the electrical signal transmitted to the DUT. Digital high-speed camera luminance capture operates asynchronously with a display timing at a speed sufficient to capture a rise time of a test signal boundary between bright and dark signal levels.

The test is performed in a dark room, with the DUT emitting the only available light from the image sensor either directly from a backlight or from the emitting pixel.

Motion blur analysis requires accurate, focused image capture where each subpixel is imaged with sufficient resolution.

(1) A lens to focus on a subpixel of the DUT is selected and horizontally resolved to the maximum number of pixels and a 1:1 magnification. The lens selection that meets the specification is commonly known as a MACRO lens (Nikon or Nikkor MICRO lens).

(2) The camera must clearly depict individual display subpixels.

(3) A long-focus macro lens is suitable for close-up work and is used for preventing barrel distortion. A field of view of less than 400 as much as possible with a lens of 60 mm or longer is maintained. Ideally, a 100 mm prime macro lens should be used.

In order to accurately resolve the motion blur, a camera shooting rate (i.e. frame capture rate, FCR) is important. At this time, the camera shooting speed is defined as FCR (e.g., 10,000 fps), which is related to blur edge resolution.

$$\text{blur edge resolution} = \frac{1}{FCR} \qquad \text{[Equation 1]}$$

An FCR of at least 10,000 fps must be used. However, if the resulting image is too noisy or dark, the FCR may be lowered to 7,200 fps or higher as a last means. The FCR used for each test is recorded.

A camera aperture refers to an aperture of the camera and is important to ensure adequate luminance for high-speed video capture. In almost all cases of this procedure, the aperture is set as wide or as large as possible. That is, this means the lowest f-stop to record as much light as possible.

Camera exposure is confirmed if luminance is particularly high. Some cameras have an overexposure warning to prevent a white level from becoming saturated. If overexposed, the aperture is adjusted by one setting at a time until the overexposure warning is removed.

Camera exposure refers to the camera's open shutter time to admit light per captured frame. In almost all cases of this procedure, the exposure is set as long as possible, close to 1/FCR. Some cameras have an overexposure warning to prevent a white level from becoming saturated. When the overexposure occurs, the aperture must be adjusted. Alternatively, the camera exposure time is reduced until the overexposure warning is removed.

Test Pattern Design

FIG. 1 illustrates a test pattern for a motion blur test which is a lighter colored bar moving across a less bright field. The field is placed on a background of constant luminance. By using a camera with sufficient resolution, a transition is captured within a pattern center approximately centered on the DUT. A test condition requires a pattern gray level. A pattern is mapped directly to a display pixel and a size is not adjusted according to display resolution.

A bar pattern and an applied code value for a bar and a center background gray level for an SDR test are preset.

A pre-gamma APL must be small enough to not affect DUT performance and lighting flare from a camera lens. Therefore, a surround luminance should be set to approximately 4% of the total luminance—a pre-gamma code value of 60d. However, the background should not be black to prevent local dimming fluctuations.

FIG. 2 is a diagram illustrating an example of a moving-blur edge captured by a camera device.

In order to start capturing an image, the following steps are followed.

(1) A pattern player program or moving bar pattern is rendered on the display device.

(2) A script that renders the selected movement pattern to the camera at the specified pixels per frame (PPF) is started.

(3) As the test pattern moves in the DUT, the image capturing is started at a predefined frame rate. A moving blur edge appears.

The camera must capture individual frames. A right side of FIG. 2 shows two examples of 10,000 fps image capture. A right image represents a leading edge, and a left image represents a trailing edge. Typically, the leading edge exhibits more blur than the trailing edge. The camera captures each edge individually.

(4) Image capture test parameters for each test are recorded, which include applied gray pattern level, pixels per frame (PPF), frame rate, camera pixel-to-display pixel ratio, camera distance, DUT display details (resolution and screen diagonal size).

In order to properly expose the image, the following steps are followed.

(1) A camera exposure setting is selected, which captures the image with sufficient sensitivity to detect blur (underexposure is more often a problem than overexposure). The overexposure may be identified when a pixel line has no texture or is solid white. The DUT luminance is set to maximum. The shutter may be set open for the entire frame capture time to maximize luminance for fast image capture. In order to maximize the shutter opening time, the time is set to a value slightly less than or equal to the frame capture time. If the white bar is noticeably overexposed in one frame capture, the shutter opening time is reduced (shorter exposure time) to reduce the camera capture luminance. The DUT luminance should not be changed after starting the test.

(2) Alternatively, if the image remains too dark after maximizing the shutter opening time, the experimenter should try a slower FCR (e.g., slower from 10,000 to 8,000 fps). This adjustment doubles the sensor's illumination.

(3) The test pattern is paused, and then the white bar luminance (code value 255d) and black luminance (code value 0d) are recorded with a luminance accuracy of ±0.2 cd/m2. The setting is recorded for purposes of verifying a test setting. Luminance values are not used in CMR calculations.

In order to capture the image stack, the following steps are followed.

(1) The moving pattern is captured for the duration of at least one DUT frame. An image analysis program requires a number of frames, N, equal to the camera's frame capture rate divided by the display frame rate.

Note: This specification suggests storing at least 4 image stacks for each transition under test. The analysis performed is an average of the CMRs found for each edge transition. The data collected must have a sufficient amount of sample image stacks to determine whether variation coefficient requirements are met.

The captured image stack must be stored across the entire sensor component depth. Recommended cameras include 10-bit or 12-bit sensors. In order to store the full width of data, high-resolution TIFF or TIF formats should be used if possible.

Although analysis tools rely on a single complete frame, the experimenter may search for the most clearly captured sequence of frames within the image stack.

FIG. 3 is a diagram illustrating an example of a blur edge captured by the camera device.

A method for processing and interpreting collected data is described.

Stack analysis of the image created after capture in the embodiment of FIG. 2 consists of steps of determining the components of the moving blur edge and calculating feature ratios including:

(1) Recording the image stack
(2) Creating a blur image by merging image stacks
(3) Creating and validating a blur profile
(4) Applying a low-pass filter if deemed necessary by a selection algorithm
(5) Calculating an effective blur edge width for each edge
(6) Calculating the CMR for each edge and combining aggregated CMR reporting values Creating Blur Profile Through Image Stack Merging Identifying Image Stack A first step in a data analysis process flow is to create a data array containing the blur image and the blur profile of each recorded image stack.

In order to merge the image stack into the blur profile:

(1) An image capture program is used to merge the image stack into the blur profile. The image capture program is obtained in VESA (CMR_capture_image.exe).

In a next order, a graphic user interface (GUI) option is described. The blur profile is a data array representing light intensity versus camera pixel position. In the image capture program, the capture parameters are set and the image stack is selected.

(2) Multiple image stacks for each edge are captured.

(3) Required data is input, and then calculated by using a CMR capture image process. It is checked whether the image blur profile includes a valid and appropriate range based on a result (e.g., an ax-axis range should span 512 camera pixels.

The image analysis program (CMR_analysis.exe) available from VESA places a transition at a center as much as possible and then crops the CMR to 512 pixels for an optimal result.

Alternatively, a user may process multiple image stacks at once by using a cmr.exe batch processor. cmr.exe includes an option to create a parameter file containing all the information input manually in the previous steps.

Building a parameter file, typically called blur_params.csv, reruns cmr.exe to build a number of blur profile images and profile data.

FIG. 3 illustrates two blur edge images.

A left image represents the leading edge, and a right image represents the trailing edge.

A monochrome sensor of the camera device captured the stack used to create the blur edge in FIG. 3. The left image shows a slight overshoot that visually sharpens the leading edge.

Background Art of Various Embodiments of Present Disclosure

FIG. 4 is a diagram illustrating an example of a graph of the number of pixels vs. luminance measured by the camera device.

Overdrive Test

The overdrive results in a significant increase in the clear motion ratio (CMR) score because the overdrive signal on the leading or trailing edge is clearer when $r^2$ and $C_m$ are higher.

Overdrive Evaluation

The overdrive is evaluated for overshoot and undershoot at leading edge and trailing edge transitions.

Graphs and statistics on the overshoot and undershoot of each edge for the leading edge and trailing edge are measured/generated.

FIG. 4 illustrates a luminance level that must be identified when evaluating the overdrive.

In this method, relative luminance is sufficient because the luminance detected by the camera varies depending on exposure and camera capture rate. FIG. 4 shows the luminance level measured by the camera device when a white bar on a black background output from the display device moves from left to right. Each edge of the white bar is captured individually. Accordingly, the present disclosure presents one set of terms for leading edge overshoot and trailing edge undershoot.

The DC level of the blur profile before and after the transition for the leading edge and trailing edge should be evaluated twice, fixed by the 50% transition point within the blur edge width (BEW) of the transition (see a 2×BEW note in FIG. 4).

FIG. 4 illustrates an overdrive state using a moving bar pattern.

(1) $L_H$ represents a high luminance level, and precedes the leading edge or follows the trailing edge.

(2) $L_L$ represents a low luminance level, and follows the leading edge or precedes the trailing edge.

(3) $L_LO$ represents a maximum overshoot luminance at the leading edge.

(4) $L_{LU}$ represents a minimum undershoot luminance at the leading edge.

(5) $L_{TO}$ represents a maximum overshoot luminance at the trailing edge.

(6) $L_{TU}$ represents a minimum undershoot luminance at the trailing edge.

The following value is a part of an amplitude between Lx and $L_L$. A condition may exceed 1.0.

$$\text{Overshoot}_{leading} = \frac{L_{LO} - L_H}{L_H - L_L}[OS_{leading}] \quad [\text{Equation 2}]$$

$$\text{Overshoot}_{trailing} = \frac{L_{TO} - L_H}{L_H - L_L}[OS_{trailing}] \quad [\text{Equation 3}]$$

$$\text{Undershoot}_{leading} = \frac{L_L - L_{LU}}{L_H - L_L}[US_{leading}] \quad [\text{Equation 4}]$$

$$\text{Undershoot}_{trailing} = \frac{L_L - L_{TU}}{L_H - L_L}[US_{trailing}] \quad [\text{Equation 5}]$$

Overdrive Test Method

The test method for evaluating the undershoot for the leading edge and the trailing edge adopts the same moving white bar as applied to the CMR.

The overshoot of the leading edge is determined by using the following process, and then the undershoot of the trailing edge is determined by repeating the following process.

(1) A moving bar pattern with a level is applied one at a time as specified in [Table 1].

(2) The blur profile is created.

(3) As specified in [Table 1], the overshoot of each edge (see Equation 2 and Equation 3) is calculated as the average of each edge. Next, a maximum value of all edge averages for the sample used to measure the CMR is find and a coefficient of a variation test command is satisfied.

(4) As specified in [Table 1], the overshoot of each edge (see Equation 4 and Equation 5) is calculated as the average of each edge. Next, the maximum value of all edge averages for the sample used to measure the CMR is find and the coefficient of a variation test command is satisfied.

(5) A test result is generated with overshoot and undershoot data values.

TABLE 1

| Measurement | Level before Transition | Level after Transition | Overshoot Value | Undershoot Value |
|---|---|---|---|---|
| OS(1) | 0% | 33% | mean (LTO) | N/A |
| OS(2) | 0% | 67% | mean (LTO) | N/A |
|  | 0% | 100% | N/A | N/A |
| OS(3) | 25% | 75% | mean (LTO) | — |
| US(1) |  |  | — | mean (LTU) |
| OS(4) | 33% | 67% | mean (LTO) | — |
| US(2) |  |  | — | mean (LTU) |
| US(3) | 33% | 100% | N/A | mean (LTU) |
| US(4) | 67% | 100% | N/A | mean (LTU) |
|  | 100% | 0% | N/A | N/A |

TABLE 1-continued

| Measurement | Level before Transition | Level after Transition | Overshoot Value | Undershoot Value |
|---|---|---|---|---|
| US(5) | 100% | 33% | N/A | mean (LLU) |
| US(6) | 100% | 67% | | |
| OS(5) | 75% | 25% | mean (LLO) | — |
| US(7) | | | — | mean (LLU) |
| OS(6) | 67% | 33% | mean (LLO) | — |
| US(8) | | | — | mean (LLU) |
| OS(7) | 67% | 0% | mean (LLO) | N/A |
| OS(8) | 33% | 0% | mean (LLO) | N/A |
| Compare to the test limit results in Table 2 | | | max (OS(1):OS(8)) | max (US(1):US(8)) |

[Table 2] shows an image quality compliance test restriction (standard).

TABLE 2

| Test Name | Condition | All Logo Performance Tiers |
|---|---|---|
| Overshoot$_{max}$ | fps = Maximum | ≤0.20 |
| Undershoot$_{max}$ | PPF$_{CEIL}$ | ≤0.10 |

(1) A test is performed at an ambient room temperature of 23.50±1° C. after an appropriate warm-up period.

(2) A maximum overshoot test includes a level that does not include a 100% bar (for example, corresponds to only test overshoot for a bar moving up to 75% (224*d*)).

(3) A maximum undershoot test includes a level that does not include a 0% central background (for example, corresponds to only test undershoot for a central background of 25% (136d) or more).

$$PPF_{CEIL} = \text{ceil}(PPF) \quad \text{[Equation 6]}$$

Here, PPF is the number of pixels per frame. PPF$_{CEIL}$ means a ceiling value of the PPF.

Reported Data Overdrive

After compiling the data in [Table 1], which includes a sampled average for each row, maximum overshoot and undershoot sizes are reported. The reported maximum magnitudes for the overshoot and the undershoot are compared to pass-fail criteria in [Table 2].

FIG. 5 is a diagram illustrating an example of a graph of the number of pixels vs. luminance measured by the camera device.

The right image in FIG. 5 is the same as FIG. 4.

The graph in the left image of FIG. 5 expresses the overshoot of the leading edge in the graph of FIG. 4 by decomposing the overshoot into components.

$m_1$ corresponds to a slope of the rise slope before the overshoot occurs.

$m_2$ corresponds to a slope in which the rise slope and the overshoot slope are combined after the overshoot occurs.

$m_3$ corresponds to a slope of the overshoot slope purely contributed by the overshoot.

An $L_H$ value is a basic luminance value and corresponds to the luminance at the time when the overshoot occurs. The $L_H$ value corresponds to the luminance value at the time when the overshoot occurs based on a line corresponding to the slope of the overshoot from an overshoot high point.

However, referring to FIG. 5, the $L_H$ value according to the existing scheme is calculated by a y-axis value of an intersection point where an $m_1$ slope line and an $m_2$ slope line meet.

In order to determine the appropriate overdrive operation level, an exact overshoot value must be determined. In [Equation 2] for determining the overshoot value, the $L_H$ value is an important variable. However, when the $m_2$ slope line is used, the $m_2$ slope does not correspond to a slope purely contributed by the overshoot because the $m_2$ slope corresponds to a slope in which the rising slope and the overshoot slope are combined. In other words, when the $L_H$ value based on the $m_2$ slope is used, the slope of the rising slope is added to the slope after the overshoot occurs, thereby determining a distorted overshoot value.

Therefore, when the $L_H$ value based on the $m_2$ slope, a problem occurs in which distorted overshoot information is provided when determining the driving level of the overdrive.

FIG. 6 is a diagram illustrating measurement of a reference luminance in a state in which a rise slope and an overshoot slope are combined.

FIG. 6 illustrates a scheme of determining the $L_H$ value according to the existing scheme.

Referring to FIG. 6, the slope of the rise slope before the overshoot occurs corresponds to ¼.

In addition, the slope of the overshoot slope purely contributed by the overshoot corresponds to 1.

The slope in which the rise slope and the overshoot slope are combined after the overshoot occurs corresponds to 5/4.

According to the existing scheme, the $L_H$ value is determined as the luminance at the time when the overshoot occurs by the intersection point where the line of the slope of the rise slope and the line of the slope in which the rise slope and the overshoot slope are combined meet. In order to distinguish the $L_H$ value from an $L_H$ value according to the scheme proposed by the present disclosure to be described below, the $L_H$ value according to the existing scheme according to the embodiment of FIG. 6 is referred to as $L_{H\_old}$.

In order to determine the appropriate overdrive operation level, an exact overshoot value must be determined. When a value of $L_{H\_old}$ is used as the $L_H$ value in [Equation 2] for determining the overshoot value, there is the problem in which the distorted overshoot information is provided when determining the driving level of the overdrive.

FIG. 7 is a diagram illustrating measurement of a reference luminance in a state in which a rise slope and an overshoot slope are combined.

FIG. 7 illustrates a scheme of determining the $L_H$ value according to the existing scheme.

Referring to FIG. 7, the slope of the rise slope before the overshoot occurs corresponds to ½.

In addition, the slope of the overshoot slope purely contributed by the overshoot corresponds to 1.

The slope in which the rise slope and the overshoot slope are combined after the overshoot occurs corresponds to 3/2.

According to the existing scheme, the $L_H$ value is determined as the luminance at the time when the overshoot occurs by the intersection point where the line of the slope of the rise slope and the line of the slope in which the rise slope and the overshoot slope are combined meet. In order to distinguish the $L_H$ value from an $L_H$ value according to the scheme proposed by the present disclosure to be described below, the $L_H$ value according to the existing scheme according to the embodiment of FIG. 7 is referred to as $L_{H\_old}$.

In order to determine the appropriate overdrive operation level, an exact overshoot value must be determined. When a value of $L_{H\_old}$ is used as the $L_H$ value in [Equation 2] for determining the overshoot value, there is the problem in which the distorted overshoot information is provided when determining the driving level of the overdrive.

Configuration of Various Embodiments of Present Disclosure

FIG. 8 is a diagram illustrating measurement of the reference luminance in a state in which the rise slope and the overshoot slope are separated.

The left graph of FIG. 8 is a graph of luminance values versus the number of camera pixels when measured by the camera device for the test image output from the display device.

From a point where the slope of the left graph is changed suddenly, a specific x-axis value of a point where the overshoot occurs may be obtained. A first slope value of the rise slope may be determined from a slope of a first portion of the left graph based on the specific x-axis value. A second slope value in which the rise slope and the overshoot slope are combined may be determined from a slope of a second portion of the right graph based on the specific x-axis value.

By subtracting a first slope value from a second slope value, a third slope value of the overshoot slope purely contributed by the overshoot may be obtained.

A new $L_H$ value may be obtained from a y-axis value for the specific x-axis value at the point where the overshoot occurs on a line extended from a highest point of the overshoot based on the third slope value.

The $L_H$ value obtained by the proposed scheme according to the embodiment of FIG. 8 will be referred to as $L_{H\_new}$.

In order to determine the appropriate overdrive operation level, an exact overshoot value must be determined. When a value of $L_{H\_new}$ is used as the $L_H$ value in [Equation 2] for determining the overshoot value, only the overshoot contributes to obtain pure overshoot information which is not distorted.

The embodiment of FIG. 8 for the overshoot may be applied in the same scheme as the undershoot.

Effects of Various Embodiments of Present Disclosure

Expected effects of various embodiments of the present disclosure are as follows.

(1) The present disclosure may provide a method and a device for accurately determining a driving level of overdrive by accurately determining a reference luminance for measuring an overshoot degree of a display device.

(2) The present disclosure may provide a device and a method for accurately determining the driving level of the overdrive by accurately determining the reference luminance using only a rise slope before overshoot occurs and an overshoot slope purely contributed by the overshoot when measuring the overshoot degree.

[Explanation Related to Display Device Claim]

Hereinafter, the above-described embodiments will be described in detail with reference to FIG. 9 in terms of the operation of a terminal. Methods to be described below are just distinguished for convenience and unless the methods mutually exclusive, it is needless to say that some components of any one method may be substituted with some components of another method or may be applied in combination with each other.

FIG. 9 is a diagram illustrating an example of an operation process of the display device according to various embodiments of the present disclosure.

According to various embodiments of the present disclosure, a method performed by the display device is provided.

The display device includes a display panel, a display driver, a transceiver, a memory, and at least one processor. The display device is connected to the camera device through wired or wireless communication through the transceiver. The camera device includes a camera, the transceiver, the memory, and at least one processor.

In step S901, the display device outputs a test motion picture through the display panel of the display device.

In step S902, the display device receives information of a graph of luminance detected by the camera device relative to the number of camera pixels of the camera device in relation to the test motion picture from the camera device configured to capture the output test motion picture. The x-axis of the graph indicates the number of camera pixels and the y-axis of the graph indicates the luminance value. The graph is composed of a first portion consisting only of the rise slope before the overshoot occurs, and a second portion in which the rise slope and the overshoot slope combined.

In step S903, the display device determines a first slope value for the rise slope in the first portion of the graph.

In step S904, the display device determines a second slope value for the combination of the rise slope and the overshoot slope in the second portion of the graph.

In step S904, the display device determines a third slope value for the overshoot slope by subtracting the first slope value from the second slope value.

In step S906, the display device determines an $L_H$ value of a first basic luminance based on the third slope value.

In step S907, the display device determines an overshoot value related to the overshoot based on the $L_H$ value.

In step S908, the display device determines an overdrive value related to the overshoot based on the overshoot value.

In step S909, the display device performs overdrive based on the overdrive value by a display driver of the display device.

According to various embodiments of the present disclosure, the $L_H$ value corresponds to a y-axis value for a specific x-axis value on a line extended from the highest point of the second portion of the graph based on the third slope value. The specific x-axis value corresponds to the number of camera pixels at a starting point of the second portion of the graph.

According to various embodiments of the present disclosure, the specific x-axis value corresponds to an x-axis value at a point where a line extended based on the first slope value for the first portion and a line extended based on the second slope value for the second portion meet.

According to various embodiments of the present disclosure, the specific x-axis value corresponds to an x-axis value of a starting point of the overshoot in the graph.

According to various embodiments of the present disclosure, the overshoot value is composed of $(L_{LO}-L_H)/(L_H-L_L)$. The $L_{LO}$ corresponds to the luminance at the highest point of the second portion. The $L_L$ may correspond to a second basic luminance after the undershoot which follows the overshoot.

According to various embodiments of the present disclosure, the overshoot value is composed of $(L_{LO}-L_H)/(L_H-L_L)$. The $L_{LO}$ corresponds to the luminance at the highest point of the second portion. The first portion and the second portion of the graph constitute the leading edge. The $L_L$ may correspond to a second basic luminance in a state in which the change in luminance after the leading edge is stable. When the change in luminance falls within a set range, the change in luminance may correspond to the stable state.

According to various embodiments of the present disclosure, the first portion and the second portion of the graph constitute the leading edge. The graph further includes a trailing edge after the leading edge. The $L_L$ corresponds to a y-axis value before the trailing edge after the undershoot in the graph.

According to various embodiments of the present disclosure, the overdrive value corresponds to a driving level of the overdrive. The driving level of the overdrive can be controlled by current/voltage applied by the display driver.

According to various embodiments of the present disclosure, the test motion picture is configured so that a white bar extending from the top to the bottom of a screen moves at a constant speed from one side to the other side on a black background.

According to various embodiments of the present disclosure, the camera device is configured to capture the test motion picture output by the display at a set number of frames per second.

According to various embodiments of the present disclosure, a display device is provided in a wireless communication system. The display device may include: a display panel, a display driver, a transceiver, a memory, and at least one processor, and the at least one processor may be configured to perform an operation method of the display device according to FIG. 9.

According to various embodiments of the present disclosure, a device that controls a terminal is provided in a communication system. The device includes at least one processor; and at one memory operably accessing the at least one processor. The at least one memory may be configured to instructions for performing the operation method of the display device according to FIG. 9 based on being executed by the at least one processor.

According to various embodiments of the present disclosure, provided are one or more non-transitory computer readable media (CRM) storing one or more instructions. The one or more instructions may perform operations based on being executed by one or more processors, and the operations may include the operation method of the display device according to FIG. 9.

Device Applicable to Present Disclosure

Hereinafter, am example of a device to which various embodiments of the present disclosure are applied will be described.

FIG. 10 is a diagram illustrating an example of a structure of the display device and the camera device according to various embodiments of the present disclosure.

Referring to FIG. 10, the display device 100 may include a processor 110, a memory 120, a transceiver 130, a display panel 140, and a display driver 150.

The processor 110 may be configured to implement procedures and/or methods proposed by the present disclosure. The processor 110 controls all operations of the display device 100. For example, the processor 110 may transmit or receive information through the transceiver 130. Further, the processor 110 writes and reads data into the memory 120. In addition, the processor 110 outputs information through the display panel 140. In addition, the processor 110 controls current/voltage for components of the display panel 140 through the display driver 150.

The memory 120 may be connected to the transceiver 130, memory 120, processor 110, the display panel 140, and the display driver 150, and may store information received from the camera device 200 through communication of the transceiver 130. In addition, the memory 120 may be connected to the processor 110 and may store data such as a basic program for an operation of the processor 110, an application program, setting information, information generated by computing of the processor 110, etc. The memory 120 may be configured by a volatile memory, a non-volatile memory, or a combination of the volatile memory and the non-volatile memory. In addition, the memory 120 may provide stored data according to a request of the processor 110.

The transceiver 130 is connected with the processor 110 to transmit and/or receive a signal. The entirety or a part of the transceiver 130 may be referred to as a transmitter, a receiver, or a transceiver. The transceiver 130 may supports at least one of various wireless communication standards including the institute of electrical and electronics engineers (IEEE) 802.xx system, an IEEE Wi-Fi system, a 3rd generation partnership project (3GPP) system, a 3GPP long term evolution (LTE) system, a 3GPP 5G new radio (NR) system, a 3GPP2 system, Bluetooth, etc.

The display panel 140 may be connected to the processor 110 and may be configured to output image information under the control of the processor 110. The display panel 140 may be composed of a plurality of pixels.

The display panel 140 may be connected to the processor 110 and may be configured to control current/voltage for components of the display panel 140 under the control of the processor 110. The display driver 150 may be configured to perform overdrive on the display panel 140 through the control of current/voltage for the components of the display panel 140.

In some embodiments, the display device 100 may be connected to the camera device 200 through the transceiver 130 through wired or wireless communication. In some embodiments, the display device 100 and the camera device 200 may be electrically connected.

The camera device 200 includes a processor 210, a memory 220, a transceiver 230, and a camera 240.

The processor 210 may be configured to implement procedures and/or methods proposed by the present disclosure. The processor 210 controls all operations of the display device 100. For example, the processor 210 may transmit or receive information through the transceiver 230. Further, the processor 210 writes and reads data into the memory 220. Further, the processor 210 performs capturing of an object through the camera 240.

The memory 220 may be connected to the transceiver 230, memory 220, processor 210, and the camera 240, and may store information received from the display device 100 through communication with the transceiver 230, information of an image captured by the camera device 100, etc. In addition, the memory 220 may be connected to the processor 210 and may store data such as a basic program for an operation of the processor 210, an application program, setting information, information generated by computing of the processor 210, etc. The memory 220 may be configured by a volatile memory, a non-volatile memory, or a combination of the volatile memory and the non-volatile memory. In addition, the memory 220 may provide stored data according to a request of the processor 210.

The transceiver 230 is connected with the processor 210 to transmit and/or receive a signal. The entirety or a part of the transceiver 230 may be referred to as a transmitter, a receiver, or a transceiver. The transceiver 230 may supports at least one of various wireless communication standards including the institute of electrical and electronics engineers (IEEE) 802.xx system, an IEEE Wi-Fi system, a 3rd generation partnership project (3GPP) system, a 3GPP long term evolution (LTE) system, a 3GPP 5G new radio (NR) system, a 3GPP2 system, Bluetooth, etc.

The camera 240 may be connected to the processor 210 and may be configured to perform capturing of an object under the control of the processor 210.

Claims set forth in various embodiments of the present disclosure may be combined in various schemes. For example, technical features of method claims of various embodiments of the present disclosure may be combined and implemented as a device, and technical features of device claims of various embodiments of the present disclosure may be combined and implemented as a method. Further, the technical features of the method claims and the technical features of the device claims of various embodiments of the present disclosure may be combined and implemented as the device, and the technical features of the method claims and the technical features of the device claims of various embodiments of the present disclosure may be combined and implemented as the method.

The invention claimed is:

1. A method for operating a display device, the method comprising:
    outputting a test motion picture by a display panel of the display device;
    receiving, from a camera device configured to capture the output test motion picture, information of a graph of a luminance sensed by the camera device for a number of camera pixels of the camera device in relation to the test motion picture, wherein an x-axis of the graph indicates the number of camera pixels and a y-axis of the graph indicates a value of the luminance, and the graph includes a first portion composed only of a rise slope before overshoot occurs, and a second portion in which the rise slope and an overshoot slope are combined;
    determining a first slope value for the rise slope in the first portion of the graph;
    determining a second slope value for the combination of the rise slope and the overshoot slope in the second portion of the graph;
    determining a third slope value for the overshoot slope by subtracting the first slope value from the second slope value;
    determining an $L_H$ value of a first basic luminance based on the third slope value, wherein the $L_H$ value corresponds to a y-axis value for a specific x-axis value on a line extended from a highest point of the second portion of the graph based on the third slope value, and the specific x-axis value corresponds to the number of camera pixels at a starting point of the second portion of the graph;
    determining an overshoot value related to the overshoot based on the $L_H$ value;
    determining an overdrive value related to the overshoot based on the overshoot value; and
    performing overdrive based on the overdrive value by a display driver of the display device.

2. The method of claim 1, wherein the specific x-axis value corresponds to an x-axis value at a point where a line extended based on the first slope value for the first portion and a line extended based on the second slope value for the second portion meet.

3. The method of claim 2, wherein the specific x-axis value corresponds to an x-axis value of a point where the overshoot is started in the graph.

4. The method of claim 1, wherein the overshoot value is computed as $(L_{LO}-L_H)/(L_H-L_L)$,
    wherein the $L_{LO}$ corresponds to a luminance at a highest point of the second portion of the graph, and
    wherein the first portion and the second portion of the graph includes a leading edge, and the graph further includes a trailing edge after the leading edge, and
    wherein the $L_L$ corresponds to a y-axis value before the trailing edge after the undershoot in the graph.

5. The method of claim 1, wherein the overdrive value corresponds to a driving level of the overdrive.

6. The method of claim 1, wherein the test motion picture is configured so that a white bar extending from a top to a bottom of a screen moves at a constant speed from one side to an other side on a black background.

7. The method of claim 6, wherein the camera device is configured to capture the test motion picture output by the display panel at a set number of frames per second.

8. A display device comprising:
    a display panel;
    a display driver;
    a transceiver;
    a memory; and
    at least one processor,
    wherein the at least one processor is configured to
    output a test motion picture by the display panel,
    receive, from a camera device configured to capture the output test motion picture, information of a graph of a luminance sensed by the camera device for a number of camera pixels of the camera device in relation to the test motion picture, wherein an x-axis of the graph indicates the number of camera pixels and a y-axis of the graph indicates a value of the luminance, and the graph includes a first portion composed only of a rise slope before overshoot occurs, and a second portion in which the rise slope and an overshoot slope are combined,
    determine a first slope value for the rise slope in the first portion of the graph,
    determine a second slope value for the combination of the rise slope and the overshoot slope in the second portion of the graph,
    determine a third slope value for the overshoot slope by subtracting the first slope value from the second slope value,
    determine an $L_H$ value of a first basic luminance based on the third slope value, wherein the $L_H$ value corresponds to a y-axis value for a specific x-axis value on a line extended from a highest point of the second portion of the graph based on the third slope value, and the specific x-axis value corresponds to the number of camera pixels at a starting point of the second portion of the graph, determine an overshoot value related to the overshoot based on the $L_H$ value, determine an overdrive value related to the overshoot based on the overshoot value, and perform overdrive based on the overdrive value by the display driver.

9. The display device of claim 8, wherein the specific x-axis value corresponds to an x-axis value at a point where a line extended based on the first slope value for the first portion and a line extended based on the second slope value for the second portion meet.

10. The display device of claim 9, wherein the specific x-axis value corresponds to an x-axis value of a point where the overshoot is started in the graph.

11. The display device of claim 8, wherein the overshoot value is computed as $(L_{LO}-L_H)/(L_H-L_L)$, wherein the $L_{LO}$ corresponds to a luminance at a highest point of the second portion of the graph, and wherein the first portion and the second portion of the graph includes a leading edge, and the graph further includes a trailing edge after the leading edge, and wherein the $L_L$ corresponds to a y-axis value before the trailing edge after the undershoot in the graph.

12. The display device of claim 8, wherein the overdrive value corresponds to a driving level of the overdrive.

13. The display device of claim 8, wherein the test motion picture is configured so that a white bar extending from a top to a bottom of a screen moves at a constant speed from one side to an other side on a black background.

14. The display device of claim 13, wherein the camera device is configured to capture the test motion picture output by the display panel at a set number of frames per second.

15. A control device for controlling a display device, comprising:

at least one processor; and at least one memory operably accessible by the at least one processor, wherein the at least one memory stores instructions for performing operations, which when executed by the at least one processor, causes the at least one processor to perform the operations that include outputting a test motion picture by a display panel of the display device;

receiving, from a camera device configured to capture the output test motion picture, information of a graph of a luminance sensed by the camera device for a number of camera pixels of the camera device in relation to the test motion picture, wherein an x-axis of the graph indicates the number of camera pixels and a y-axis of the graph indicates a value of the luminance, and the graph includes a first portion composed only of a rise slope before overshoot occurs, and a second portion in which the rise slope and an overshoot slope are combined;

determining a first slope value for the rise slope in the first portion of the graph;

determining a second slope value for the combination of the rise slope and the overshoot slope in the second portion of the graph;

determining a third slope value for the overshoot slope by subtracting the first slope value from the second slope value;

determining an $L_H$ value of a first basic luminance based on the third slope value, wherein the $L_H$ value corresponds to a y-axis value for a specific x-axis value on a line extended from a highest point of the second portion of the graph based on the third slope value, and the specific x-axis value corresponds to the number of camera pixels at a starting point of the second portion of the graph;

determining an overshoot value related to the overshoot based on the $L_H$ value;

determining an overdrive value related to the overshoot based on the overshoot value; and performing overdrive based on the overdrive value by a display driver of the display device.

\* \* \* \* \*